United States Patent [19]
Rhodes

[11] 3,906,709
[45] Sept. 23, 1975

[54] ROTARY MOWER

[75] Inventor: Keith H. Rhodes, Winneconne, Wis.

[73] Assignee: J. I. Case Company, Racine, Wis.

[22] Filed: Jan. 21, 1974

[21] Appl. No.: 434,922

[52] U.S. Cl. .................................. 56/13.3; 56/503
[51] Int. Cl. ........................................... A01d 35/26
[58] Field of Search ......... 56/13.3, 16.9, 17.5, 503, 56/255

[56] References Cited
UNITED STATES PATENTS
2,701,942   2/1955   Caldwell, Jr. et al. ............ 56/503 X
2,843,991   7/1958   Poehls ................................ 56/13.3

Primary Examiner—Louis G. Mancene
Assistant Examiner—J. N. Eskovitz
Attorney, Agent, or Firm—Dressler, Goldsmith, Clement & Gordon, Ltd.

[57] ABSTRACT

The invention disclosed herein relates to rotary mowers of the type that include a rotary mower blade and a fan for directing the clippings to a collection area. The fan is of the cross-flow type and is positioned with respect to the periphery of the rotary blades so that a vortex is created adjacent the periphery of the blade to enhance the flow of clippings from the rotary blade through the fan. The shaft supporting the fan is positioned perpendicular to the shaft for the rotary blade and a belt is utilized for driving the fan shaft from the blade shaft with the inner surface of the belt cooperating with the blade shaft while the outer surface cooperates with a disc secured to the fan shaft.

6 Claims, 5 Drawing Figures

1

ROTARY MOWER

BACKGROUND OF THE INVENTION

In recent years, a considerable amount of attention has been directed towards lawn maintenance. Many major agricultural equipment manufacturers have been directing their efforts towards supplying "rider" vehicles for such lawn maintenance.

Most riding lawn mowers have no provision for collecting the clippings or other lawn cluttering material for the purpose of convenient disposal. Usually, the clippings are returned directly to the lawn and the amount of clippings or cut grass and the like returned to the lawn is frequently of such large proportion as to render the appearance of the lawn untidy.

While numerous proposals have been made for collecting the clippings in a suitable bag or the like, in most instances, these devices have not proven satisfactory for commercial uses.

SUMMARY OF THE INVENTION

The present invention contemplates a lawn mower that has a rotary blade supported on a shaft that is rotated about a vertical axis and a fan supported in a fan housing for rotation on a shaft about a horizontal axis and the fan shaft is driven from the blade shaft by a belt and a unique drive mechanism that eliminates the need for complicated gearing. Also, the fan is of the cross-flow type and the fan housing and blade housing are positioned such that the cross-flow fan creates a vortex adjacent the periphery of the blade and the vortex has an upwardly directed component which enhances the flow of materials from the rotary blade to the fan housing.

More specifically, the drive mechanism includes a drive belt connected to the blade shaft for driving the blade and the fan is driven by an endless belt that has an inner surface in engagement with a pulley on the blade shaft and an outer surface that cooperates with a disc on the fan shaft so that two shafts, positioned perpendicular to each other, can be driven without using any expensive gearing.

The invention also contemplates having two cutter blades supported on shafts extending parallel to each other with a fan shaft located perpendicular to the two blade shafts. In this embodiment, the two blade shafts are driven by one belt and the fan shaft is driven by another belt that cooperates with one blade shaft in the manner described above.

DETAILED DESCRIPTION OF THE PREFERRED EMBODIMENT

Figure 1:
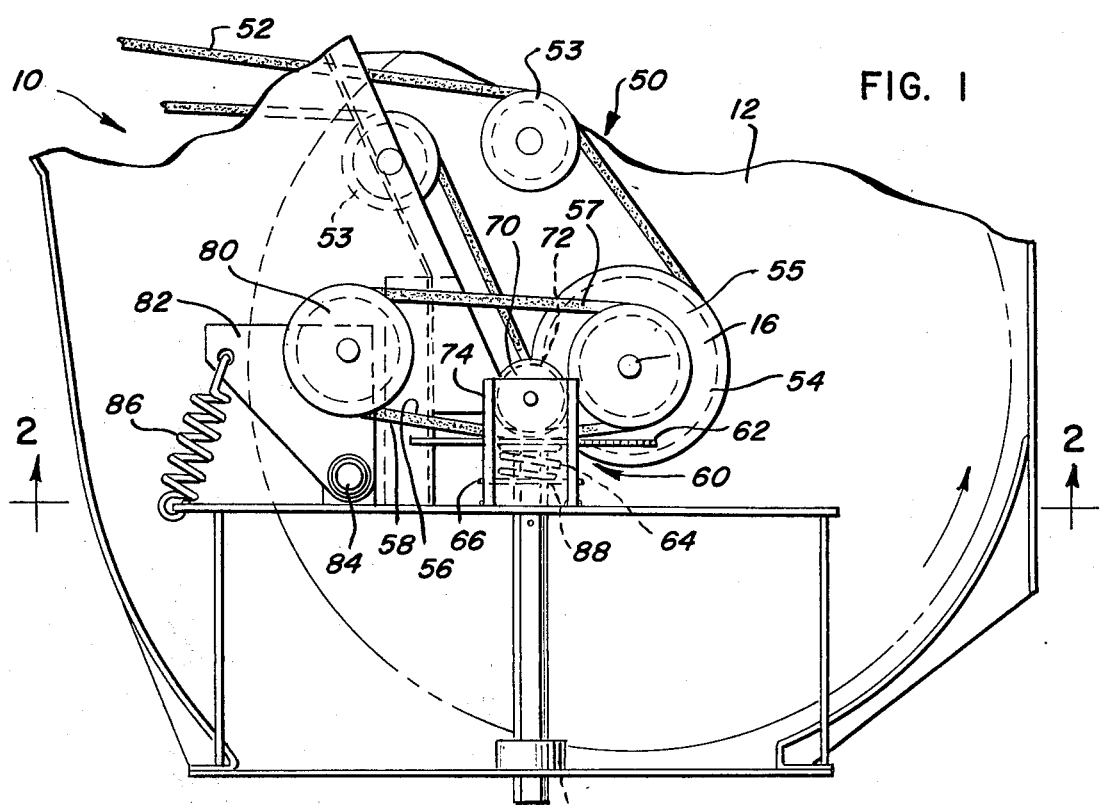
FIG. 1 of the drawings shows a fragmentary plan view of a mower having the present invention incorporated therein.

While this invention is susceptible of embodiment in many different forms, there is shown in the drawings and will herein be described in detail, preferred embodiments of the invention with the understanding that the present disclosure is to be considered as an exemplification of the principles of the invention and is not intended to limit the invention to the embodiments illustrated.

Figure 2:
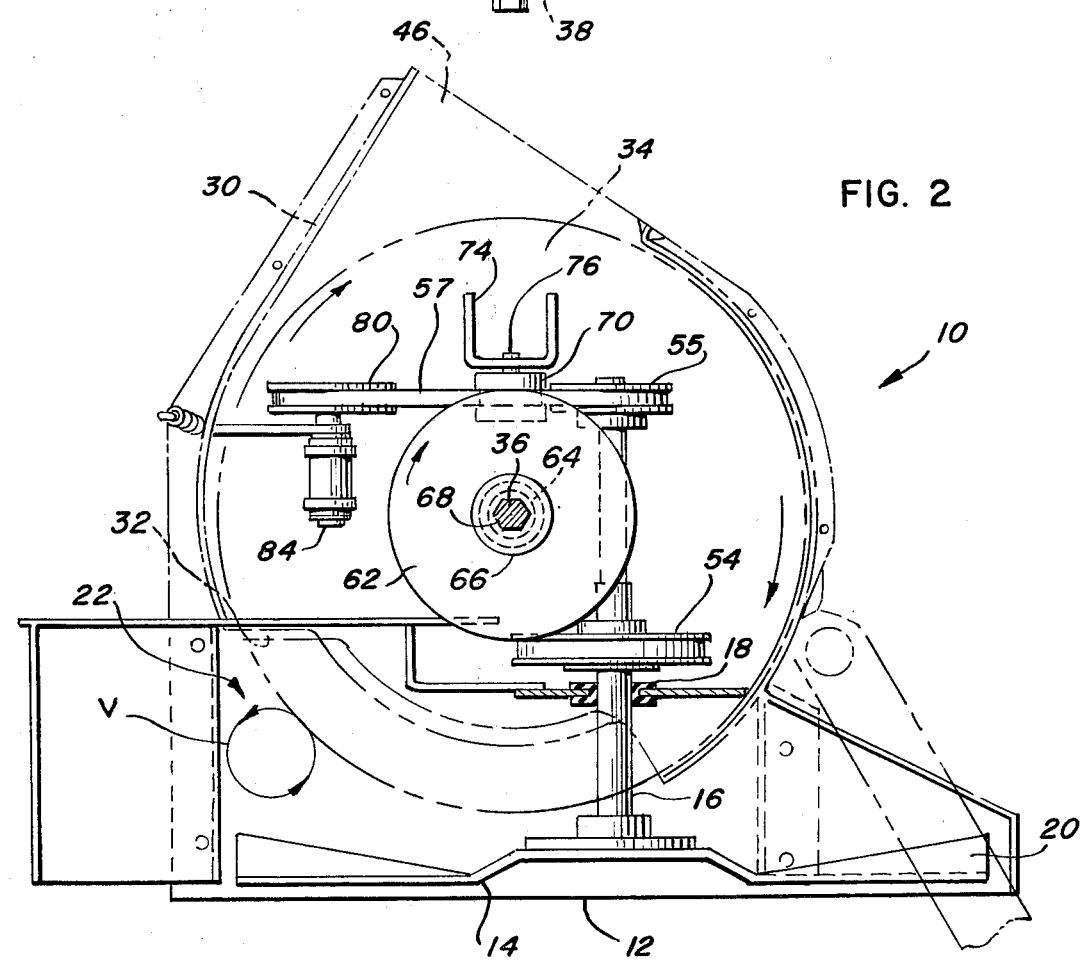
FIG. 2 is a side elevation view, partly in section with the fan and housing shown in phantom lines for purposes of clarity, showing further details of the mower of FIG. 1.

FIGS. 1 and 2 of the drawings show a rotary lawn mower, generally designated by the reference numeral 10. Mower 10 includes a blade housing 12 that has a rotary blade 14 secured at its center to a blade shaft 16 that is rotatably supported on housing 12 through suitable bearing means 18. Blade 14 has means in the form of upwardly directed portions 20 on the outer trailing ends of the blade for directing the grass clippings upwardly adjacent the periphery of the blade to an outlet port or opening 22 as it rotates and cuts the grass by the leading edges of the blade.

Figure 4:
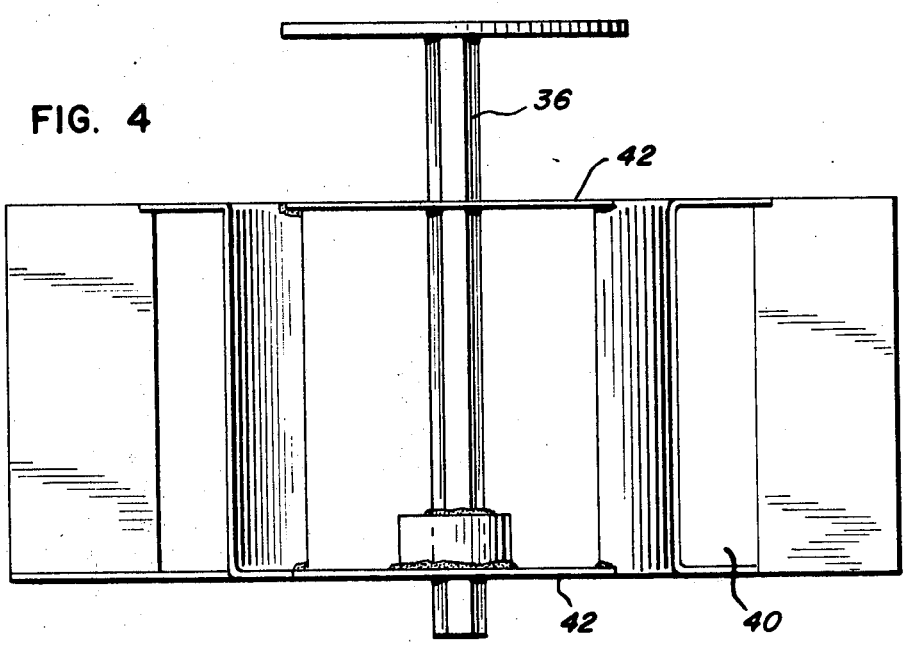
FIG. 4 is a plan view of the cross-flow fan.
Figure 5:
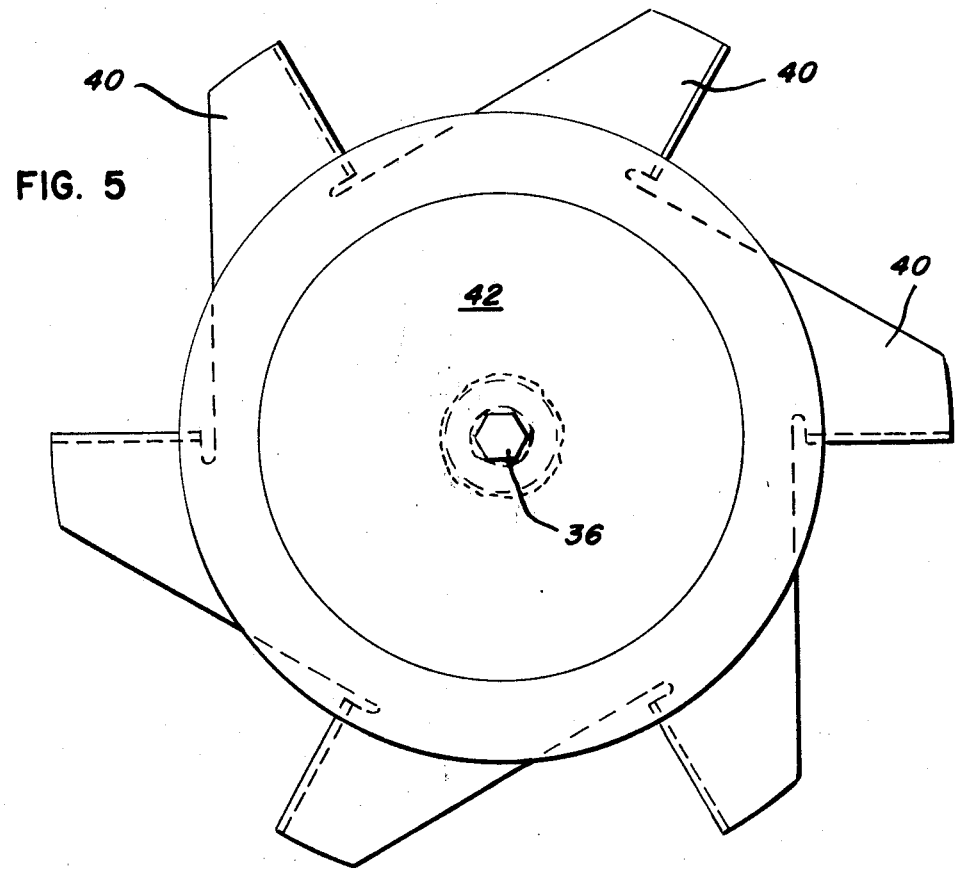
FIG. 5 is a side elevation of the fan shown in FIG. 4.

Mower 10 also incorporates a fan housing 30 that is located above blade housing 12 and has an inlet 32 communicating with outlet port 22. Fan housing 30 has a cross-flow rotor 34 supported on a fan shaft 36 that is rotatably supported by bearings 38 on fan housing 30. As more clearly shown in FIGS. 4 and 5, the cross-flow fan is of the open center type with circumferentially spaced blades 40 secured to shaft 38 by end plates 42. The configuration and location of the blades 40 and the housings 30 and 12 is such that a vortex V (FIG. 2) is created in the outlet port 22 for housing 20. The vortex V is a mass of rotating air that is rotating in a direction opposite the direction of rotation of fan 34 and produces an upwardly directed component of air flow adjacent the periphery of blade 14 to enhance the flow of materials from the outlet port 22 to the inlet 32 of the fan housing. This particular feature has been found to substantially increase the efficiency of operation of the unit.

The grass clippings that are directed upwardly through the inlet 32 of fan housing 30 flow through the center of the fan 34 and exit from the housing through outlet port 46.

The particular combination and arrangement of the blades and housing will result in a synergistic effect between the mower blade and the cross-flow fan to produce a clean pick-up of all of the grass clippings that are being severed by the mower blade 14.

The mower 10 of the present invention also incorporates a unique drive mechanism for driving the respective shafts which are located perpendicular to each other. In arrangements such as this, it is customary to utilize some type of bevel gearing arrangement between the two shafts (the blade shaft and fan shaft) and then drive one of the shafts from an outside source. This arrangement is not only extremely expensive in the manufacture and maintenance of the unit, but also it is limiting in what type of speed ratios that can be developed between the fan shaft and the blade shaft. For example, if any change in speed of the two shafts is desired, it is necessary to replace all of the gearing with gears of different size to accomplish the change in speed ratio.

The drive mechanism of the present invention incorporates an extremely simple drive arrangement utilizing a single V-belt for driving the fan shaft from the blade shaft, which are located perpendicular to each other. The drive arrangement is readily adjustable to vary the speed ratio between two shafts.

As shown in FIGS. 1 and 2, drive mechanism 50 includes drive means for the blade shaft that is illustrated as an endless belt 52 that is entrained over idler pulleys 53 and a drive pulley 54 secured to blade shaft 54. Belt 52 may be driven by any suitable power source, such as the tractor to which the mower is usually attached.

Drive mechanism 50 further includes a drive pulley 55 that is attached to the upper end of blade shaft 16 and cooperates with the inner surface 56 of belt 57. Drive mechanism 50 also includes drive means 60 cooperating with fan shaft 36 and with the outer surface 58 of belt 57 to drive the fan shaft from the belt.

Drive means 60 is clearly shown in FIGS. 1 and 2 and consists of friction disc 62 carried by shaft 36 and biased into engagement with outer surface 58 of belt 57 by biasing means in the form of a spring 64. One end of spring 64 is in direct engagement with one surface of friction disc 62 while the opposite end is in engagement with a washer 66 that has its opposite surface engaging the inner face of bearing 38 so that washer 66 and spring 64 rotate with shaft 36 and friction disc 62. As most clearly shown in FIG. 2, shaft 36 is polygonal or hexagonal and friction disc 62 has a corresponding opening 68 to insure that disc 62 rotates with shaft 36.

The drive means 60 for fan shaft 36 also incorporates an idler pulley 70 that cooperates with the inner surface 56 of belt 57 for maintaining the outer surface of the belt against friction disc 62. Idler pulley 70 has a recess 72 that receives belt 57 and the recess has a depth that is less than the thickness of the belt between the inner and outer surfaces 56 and 58. Idler pulley 70 is supported on a bracket 74 that extends from fan housing 30 and has a stub shaft 76 extending therefrom for supporting pulley 70.

The drive mechanism 50 also incorporates an idler pulley 80 that is supported on a bracket 82 which is pivotally supported on a pin 84 that is fixed to fan housing 30. Idler pulley 80 has a recess that receives the belt 57 and pulley 80 is biased through spring 86 cooperating with bracket 82 to maintain a predetermined tension on belt 57. To complete the drive assembly, one or both of idler pulleys or sheaves 53 that cooperate with belt 52 may be spring biased similar to pulley 80 to maintain a predetermined tension on belt 52.

The operation of drive means 50 will now be described. With belt 52 being driven by a suitable power source, blade shaft 16 and cutter blade 14 will be driven at a desired speed. At the same time, belt 57 is driven by blade shaft 16 and the outer surface of belt 57 is maintained in frictional engagement with the adjacent surface of disc 62 to drive fan shaft 36 from blade shaft 16. The speed of rotation of fan shaft 36 is determined by the radial distance between the center of shaft 36 and the point of contact between friction disc 62 and belt 57.

It will be appreciated that this arrangement allows for readily varying the speed between shaft 16 and fan shaft 36. This may be accomplished by having pulleys 55 and 80 vertically adjustable or axially movable on their supporting shafts. By vertically moving these pulleys, outer surface 58 of belt 57 will be engaging the friction disc at a different radial location and thereby vary the speed of fan shaft 36 with respect to blade shaft 16.

Figure 3:
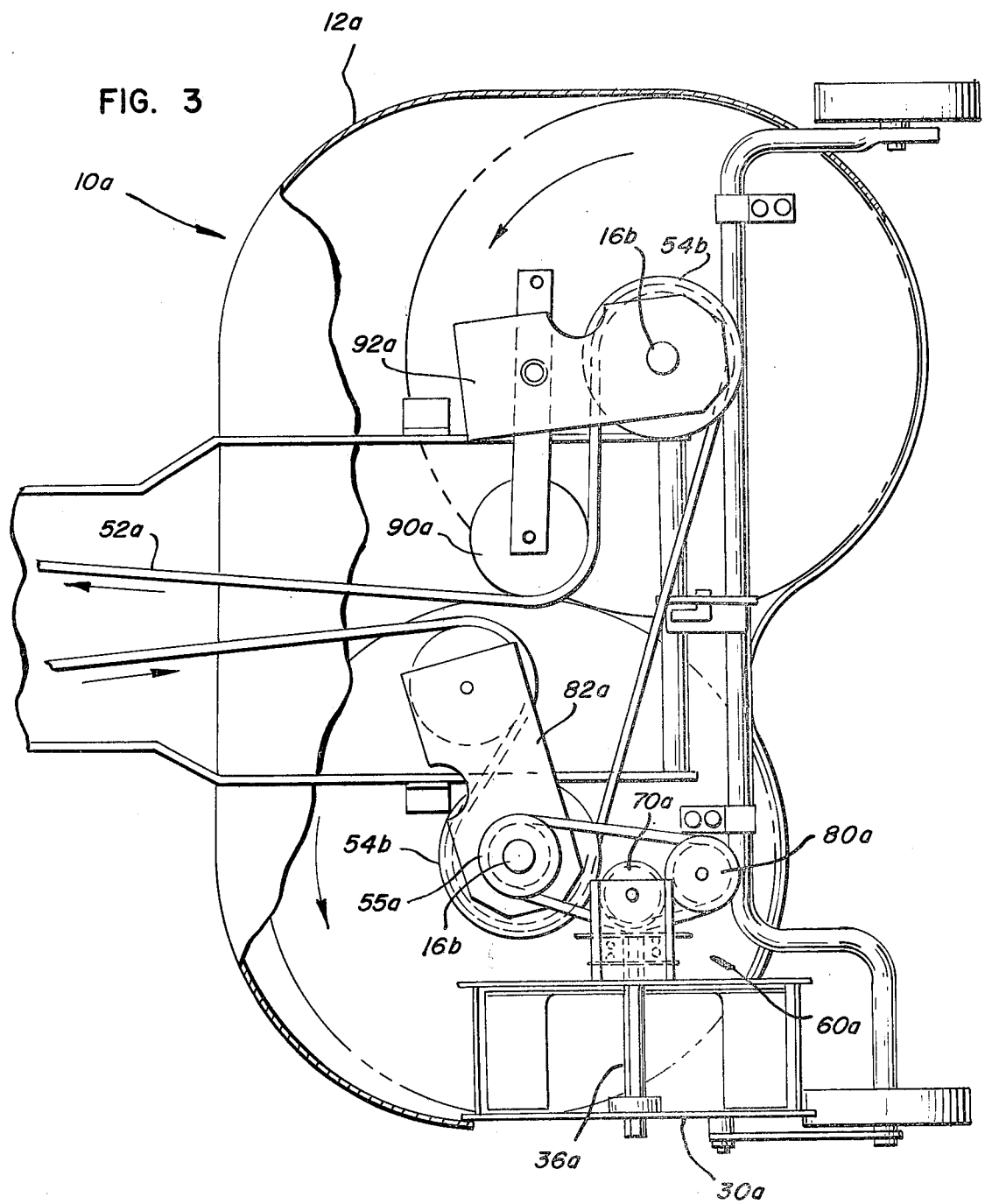
FIG. 3 is a slightly modified form of a mower having two sets of cutting blades.

The same drive arrangement may be utilized in a mower having a pair of spaced rotary blades, such as shown in FIG. 3. Since all of the parts are substantially identical in construction and operation, like reference numerals have been applied to similar parts and the suffix "a" has been added to each of the reference numerals. The second blade and cooperating elements have been identified by utilizing the suffix "b" with respect to the same parts.

In the embodiment illustrated in FIG. 3, blade housing 12a supports a pair of blade shafts 16a and 16b which respectively have idler pulleys 54a and 54b secured to the upper ends thereof and blades (not shown) secured to the lower end thereof. The drive means 60a for fan shaft 36a is identical in construction to that described in the embodiment of FIGS. 1 and 2 and will not be repeated herein.

The remainder of the drive mechanism for the twin blade rotary mower shown in FIG. 3 incorporates a pair of idler pulleys 90a which are respectively supported on bracket structures 92a. One or both of the bracket structures 92a may be pivotally supported on a suitable pivot structure, such as the upper ends of shafts 16a or 16b and spring bias by suitable springs (not shown in FIG. 3) to maintain the desired tension on belt 52a.

The drive arrangement for the embodiment shown in FIG. 3 operates identical to that shown in FIG. 2. In this embodiment, the grass clippings cut by blade 16b are forced across the housing to blade 16a, which delivers the grass clippings to fan housing 30a.

As can be appreciated from the above description, the present invention provides a unique mower-blower combination that operates more efficiently than mower-blowers heretofore known, and the drive mechanism incorporates a minimum number of inexpensive "shelf" items that substantially reduces the overall cost of the entire structure.

What is claimed is:

1. In a mower having a rotary blade supported on a blade shaft for rotation about a vertical axis in a blade housing which has an upwardly opening outlet port and a fan supported in a fan housing for rotation on a fan shaft about a horizontal axis perpendicular to said vertical axis, drive means for said blade shaft, an endless belt having inner and outer surfaces, a pulley on said blade shaft cooperating with said inner surface of said belt; and means on said fan shaft cooperating with said outer surface for driving said fan shaft from said belt.

2. A mower as defined in claim 1, in which said means on said fan shaft includes a friction disc carried by said fan shaft and engaging said outer surface at a location spaced from the axis for said fan shaft, and biasing means maintaining said friction disc in engagement with the outer surface of said belt.

3. A mower as defined in claim 2, further including an idler pulley engaging said belt with biasing means and cooperating with said idler pulley to maintain tension on said belt.

4. A mower as defined in claim 2, further including an idler pulley engaging the inner surface of said belt adjacent said disc, said idler pulley having a recess receiving said belt with said recess having a depth less than the thickness of said belt between said inner and outer surfaces.

5. A mower as defined in claim 4, in which said disc is axially movable on said fan shaft and said biasing means includes a spring engaging said disc.

6. A mower as defined in claim 1, further including a second blade shaft spaced from said blade shaft, and in which said drive means includes a further belt for driving both of said blade shafts.

* * * * *